C. F. JENKINS.
FILM WINDING DEVICE.
APPLICATION FILED MAY 22, 1911.
1,093,933.
Patented Apr. 21, 1914.
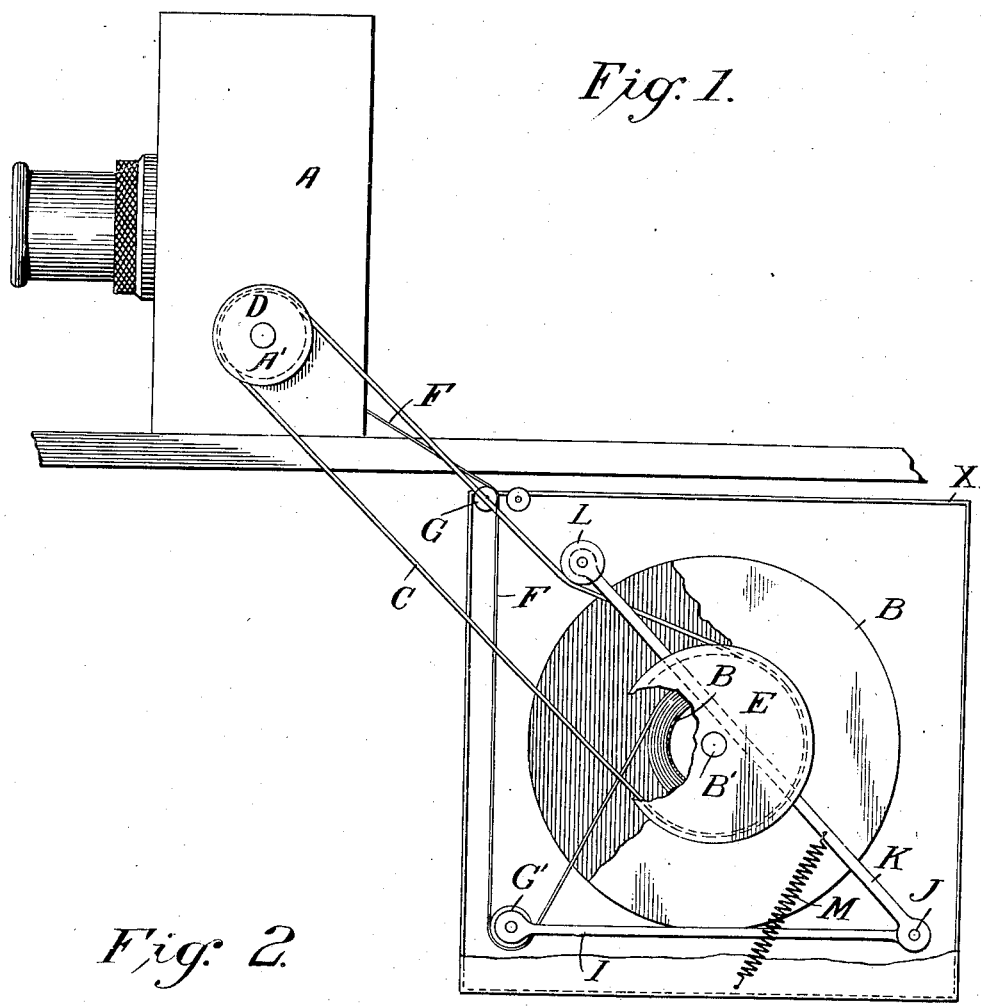
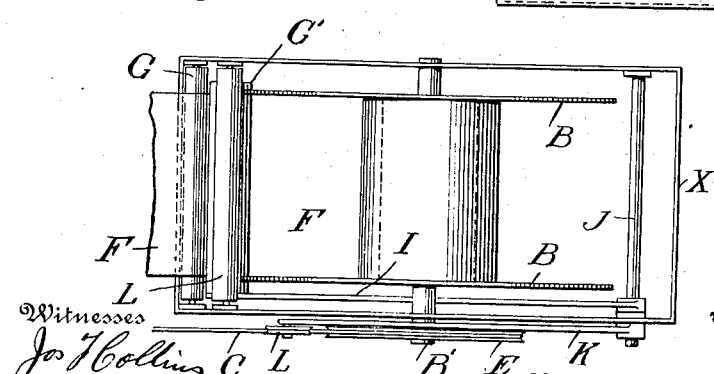
Witnesses
Jo. Hollins
R. Craig Greene
Inventor
C. F. Jenkins
By Wallace Greene,
Attorney

UNITED STATES PATENT OFFICE.

CHARLES FRANCIS JENKINS, OF WASHINGTON, DISTRICT OF COLUMBIA.

FILM-WINDING DEVICE.

1,093,933.  Specification of Letters Patent.  Patented Apr. 21, 1914.

Application filed May 22, 1911. Serial No. 628,841.

*To all whom it may concern:*

Be it known that I, CHARLES FRANCIS JENKINS, a citizen of the United States, residing at Washington, in the District of Columbia, have invented certain new and useful Improvements in Film-Winding Devices, of which the following is a specification, reference being had therein to the accompanying drawing.

The general object of this invention is to provide means whereby the minimum tension needed at any time in winding motion picture film as it is delivered by the exposing or projecting apparatus shall never be materially exceeded.

It is common to employ slipping belts to compensate for the increased rate of winding due to the gradual increase in the size of the film roll, such belts slipping whenever the tension upon the film causes sufficient resistance of the drum to rotation. This resistance to slipping is usually invariable while the lever arm through which the film tension acts is gradually increased through the increasing diameter of the film roll upon the winding drum. It follows that if the apparatus be so made that the film tension when the roll is at a maximum is very slight, so that it may not prevent proper winding nor greatly wear the film by drawing it strongly against the teeth of the sprocket drum from which it usually comes and is yet sufficient to cause slipping as much as may be desirable, the tension will necessarily be much greater when the roll is near a minimum. This follows since the tension acting through a short lever arm must be increased before any slipping will be caused. This undesirable tension greatly shortens the life of the film, which is expensive.

The present invention avoids this difficulty by providing means whereby the tension is automatically maintained at substantially the minimum tension sufficient when the film roll is at a maximum.

In the accompanying drawings, Figure 1 shows in side elevation so much of a motion picture apparatus as is directly involved when my devices are used. Fig. 2 is a plan view of the same devices.

In these figures, A represents a camera or projecting apparatus which delivers the film to be wound and which is of such nature that it has a rotary shaft A', and B a winding drum mounted upon a rotary shaft B' and inclosed in a casing X. The shaft B' is driven by a belt C passing around pulleys D and E upon the shafts A' and B', respectively.

F represents the film coming from the apparatus A and passing around rollers G, G' and thence to the drum. The roller G' is mounted upon an arm I projecting from a rock-shaft J mounted in the casing and provided with a second arm K which has at its free end a roller L which rests upon the belt and is constantly urged against the same by a very light spring M of any suitable character, tending to rock the rock-shaft in the proper direction. The tension of the spring is so adjusted that when the film roll is at a minimum the belt will wind the film without slipping and will hold it under very light tension. As the size of the film roll increases, each revolution winds up a greater length of film and as the delivery of film from the apparatus A does not correspondingly vary, the tendency is to increase the film tension. Any material increase of tension lifts the roller G', the spring yielding, and swings the roller L, correspondingly lessening the tension on the belt so that it may slip. This action occurs whatever the size of the film roll, any increase of the predetermined light film tension correspondingly decreasing the belt tension so that the belt slips the more easily. Thus the film tension regulates the belt tension, automatically, and the film tension itself is kept at substantially the lowest point consistent with winding nearly loose film.

It is obviously not essential that the film or the belt be deflected in a patricular direction from normal direction, nor that the invention, in its broader aspect, be limited to the specific means for governing the rotation of the drum by means of the film tension.

What I claim is:

1. The combination with a closed casing, of a film drum mounted in the casing with its shaft projecting therefrom and bearing an external driving pulley, a belt driving said pulley, a rock-shaft parallel to the drum's axis mounted in and projecting from the casing, a rigid arm fixed to the rock-shaft without the casing and provided with a roller normally deflecting one fold of the driving belt, and a rigid arm fixed to the rock-shaft within the casing and bearing at its free end a roller parallel to the rock-shaft in position, normally, for deflecting the film passing to the drum.

2. The combination with a film delivery device having a rotary shaft bearing a pulley, of a closed casing or film magazine, a film drum mounted in the casing upon a rotary shaft projecting from the latter, a pulley mounted upon the projecting portion of the drum shaft, a belt operatively connecting the two pulleys, a rock-shaft mounted in the casing and parallel to the drum, an internal arm extending from the rock-shaft across the casing to a point below and at one side of the vertical plane of the drum, an external arm projecting from the rock shaft to a point alongside said belt, a roller, parallel to the drum, mounted on the free end of the internal arm, a pulley mounted on the free end of the external arm and normally resting upon the belt, a film guide mounted in the top of the casing directly above the roller, and a spring resisting swinging of the arms under tension of the film upon said roller.

In testimony whereof I affix my signature in presence of two witnesses.

CHARLES FRANCIS JENKINS.

Witnesses:
JAMES L. CRAWFORD,
ROBERT CRAIG GREENE.